(12) United States Patent
Kim et al.

(10) Patent No.: US 8,842,635 B2
(45) Date of Patent: Sep. 23, 2014

(54) APPARATUS AND METHOD FOR ANTI-COLLISION IN WIRELESS POWER TRANSMISSION

(75) Inventors: Nam Yun Kim, Seoul (KR); Chang Ho Lee, Suwon-si (KR); Sang Wook Kwon, Seongnam-si (KR); Yun Kwon Park, Dongducheon-si (KR); Young Tack Hong, Seongnam-si (KR)

(73) Assignees: Samsung Electronics Co., Ltd., Suwon-si (KR); LCLINK Co., Ltd., Seoul (KR)

( * ) Notice: Subject to any disclaimer, the term of this patent is extended or adjusted under 35 U.S.C. 154(b) by 186 days.

(21) Appl. No.: 13/464,515

(22) Filed: May 4, 2012

(65) Prior Publication Data

US 2012/0282971 A1    Nov. 8, 2012

(30) Foreign Application Priority Data

May 6, 2011   (KR) .................. 10-2011-0042899
May 4, 2012   (KR) .................. 10-2012-0047202

(51) Int. Cl.
*H04W 4/00*    (2009.01)
*H04B 5/00*    (2006.01)

(52) U.S. Cl.
CPC .................................. *H04B 5/0037* (2013.01)
USPC ......................................... 370/331; 455/522

(58) Field of Classification Search
CPC ..... H04W 80/04; H04W 36/18; H04W 84/12; H04W 72/04; H04L 2012/64; H04L 12/64; H04L 12/66
USPC ................. 370/331, 328, 329, 338, 352, 401; 455/417, 428, 411, 435.2; 340/10.52; 705/22

See application file for complete search history.

(56) References Cited

U.S. PATENT DOCUMENTS 6,618,580 B2 *   9/2003   Parrott et al. ................. 713/310
7,737,824 B2 *   6/2010   Aikawa et al. ............... 340/10.4
8,369,265 B2 *   2/2013   Vendrow et al. ............. 370/328

FOREIGN PATENT DOCUMENTS

| JP | 2002-185628 | 6/2002 |
| JP | 2008-206233 | 9/2008 |
| JP | 2009-213295 | 9/2009 |
| JP | 2010-011650 | 1/2010 |
| JP | 2010-063245 | 3/2010 |
| KR | 2009-213294 | 9/2009 |
| KR | 10-2010-0112034 | 10/2010 |
| KR | 10-2011-0032260 | 3/2011 |
| KR | 10-2011-0037732 | 4/2011 |

* cited by examiner

*Primary Examiner* — Chi Pham
*Assistant Examiner* — Alexander O Boakye
(74) *Attorney, Agent, or Firm* — NSIP Law

(57) ABSTRACT

Provided is an anti-collision method and apparatus used during wireless power transmission with respect to a plurality of target devices. According to one general aspect, an anti-collision method in wireless power transmission may include: transmitting, from a source device to one or more target devices, an access standard instruction including an access standard that is used for identifying the target devices; transmitting, to the one or more target devices, a call parameter used to detect identifications (IDs) of the target devices, generated based on the access standard; and assigning, to the one or more target devices, control IDs based on response signals that the one or more target devices transmits in response to the call parameter.

29 Claims, 15 Drawing Sheets

FIG. 4B
| REFERENCE POINT FIELD | CALL ARGUMENT FIELD | MOVEMENT ARGUMENT FIELD |
|---|---|---|
| 'M' or 1<br>'L' or 0 | 1~n | 0~n |
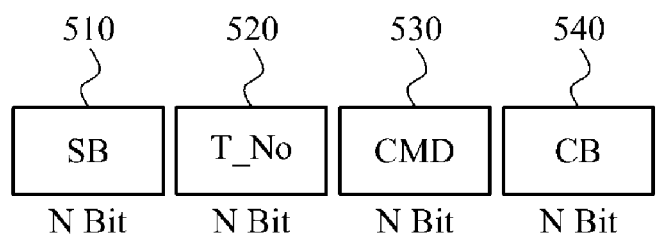
FIG. 5
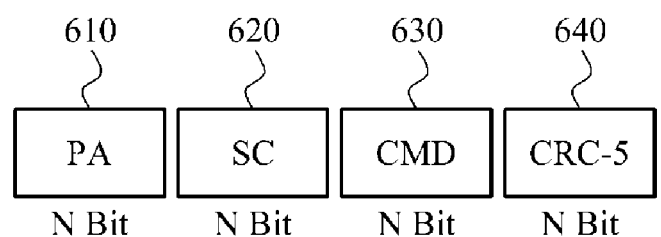
FIG. 6

FIG. 15

| ID configuration | Zones | Description |
|---|---|---|
| A | Manufacturer ID | Information on manufacturer of product |
| B | Product type | Information on product type, maximum output, and size of resonator |
| C | Model type | Maximum number of targets |
| D | Serial No. | Unique serial number assigned in manufacturing of product |
| E | Short ID | Short ID created from unique serial number of product |
| F | Standard version ID | Information on standard of source |

FIG. 16

| ID configuration | Zones | Description |
|---|---|---|
| A | Manufacturer ID | Information on manufacturer of product |
| B | Product type | Information on product type, and charging scheme |
| C | Battery type | Information on battery type, voltage capacity, and current capacity |
| D | Serial No. | Unique serial number assigned in manufacturing of product |
| E | Short ID | Short ID created from unique serial number of product |
| F | Standard version ID | Information on standard of target |

FIG. 17

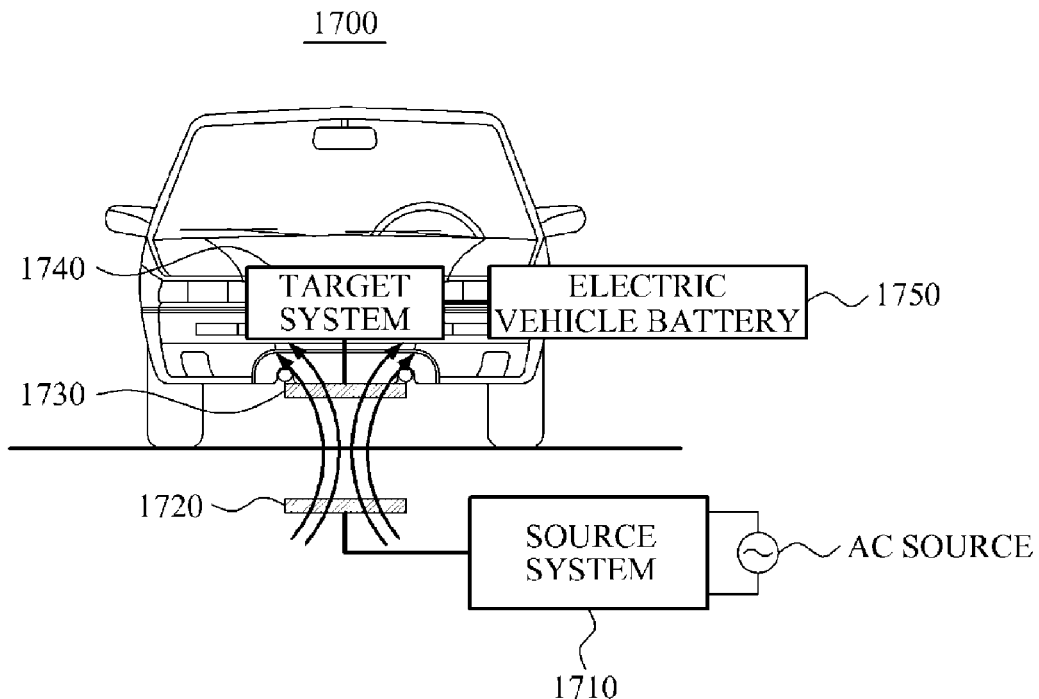

APPARATUS AND METHOD FOR ANTI-COLLISION IN WIRELESS POWER TRANSMISSION

CROSS-REFERENCE TO RELATED APPLICATION(S)

This application claims the benefit under 35 U.S.C. §119 (a) of Korean Patent Application No. 10-2011-0042899, filed on May 6, 2011, in the Korean Intellectual Property Office, and Korean Patent Application No. 10-2012-0047202, filed May 4, 2012, in the Korean Intellectual Property Office, the entire disclosure of each of which is incorporated herein by reference for all purposes.

BACKGROUND

1. Field

The following description relates to wireless power transmission.

2. Description of Related Art

As demand for portable electronic devices has rapidly increased, use of wired power supplies for these devices has become more inconvenient. Studies on wireless power transmission have been conducted to overcome inconveniences of wired power supplies and the limited capacity of conventional batteries. One conventional wireless power transmission technology uses a resonance characteristic of a radio frequency (RF) device that may include a source that supplies power and a target that receives power.

SUMMARY

According to one general aspect, an anti-collision method in wireless power transmission may include: transmitting, from a source device to one or more target devices, an access standard instruction including an access standard that is used for identifying the target devices; transmitting, to the one or more target devices, a call parameter used to detect identifications (IDs) of the target devices, generated based on the access standard; and assigning, to the one or more target devices, control IDs based on response signals that the one or more target devices transmits in response to the call parameter.

The access standard instruction may include: a reference point field, a call argument field, a movement argument field, or any combination thereof, wherein the reference point field indicates a reference point used for generating an ID from a unique ID of a target device, the call argument field indicates predetermined n consecutive bits from the reference point, and the movement argument field indicates a number of bits corresponding to movement of the reference point.

The unique ID of the target device may be set as a unique serial number or a short ID stored in a system information area of the target device.

The system information area of the target device may include: a manufacturer ID zone, a product type zone, a battery type zone, a serial number zone, a short ID zone, a standard version ID zone, or any combination thereof.

The transmitting of the call parameter may include: transmitting, at predetermined time intervals, the call parameter generated based on a value set in the call argument field.

The assigning may include: assigning a control ID to a target device having an ID identical to the call parameter when the target device transmits an acknowledgement (ACK) signal in response to the call parameter.

The transmitting of the access standard instruction may include: changing a value set in the movement argument field, when one or more ACK signals are received from one or more target devices having the same ID, so as to update the access standard instruction; and transmitting an updated access standard instruction to the one or more target devices having the same ID.

The transmitting of the call parameter may include: changing the set value in the call argument field, so as to update the call parameter; and transmitting, at predetermined time intervals, an updated call parameter to the one or more target devices having the same ID.

The predetermined n bits set in the call argument field may be determined based on the number of target devices.

The predetermined n bits set in the call argument field may be determined based on information associated with the maximum number of target devices that the source device is able to transmit power to, the information being stored in a system information area of the source device.

The system information area of the source device may include: a manufacturer ID zone, a product type zone, a model type zone, a serial number zone, a short ID zone, a standard version ID zone, or any combination thereof.

The method may further include: sensing a plurality of target devices simultaneously accessing a wireless power transmission area of the source device.

The method may further include: transmitting, to the one or more target devices, a wake-up power based on a system information area of the source device.

The method may further include: transmitting wireless power, data or both to the one or more target devices that receives the control IDs.

According to another general aspect, an anti-collision method in wireless power transmission may include: transmitting, from a source device to one or more target devices in a wireless power transmission area, an access standard instruction including an access standard to be used for identifying the one or more target devices; transmitting, to the one or more target devices, a call parameter generated based on a value set in a call argument field; determining whether at least one response signal is received from the one or more target devices in response to the call parameter; determining whether overlapping identifications (IDs) exist among IDs of the one or more target devices based on a number of the at least one response signal, when the at least one response signal is received; and assigning a control ID to a target device that transmits a response signal, when the number of the at least one response signal is one and the overlapping IDs are absent among the IDs of the one or more target devices.

The method may further include: determining whether the call parameter is a last call parameter when the at least one response signal is not received; changing the call parameter when the call parameter is not the last call parameter; and transmitting, to the one or more target devices, the call parameter that is changed.

The method may further include: changing a value set in a movement argument field when the overlapping IDs exist among the IDs of the one or more target devices; transmitting, to one or more target devices having the same IDs, an updated access standard including the movement argument field in which the set value is changed; and transmitting an updated call parameter to the one or more target devices having the same ID.

The method may further include: determining whether at least one response signal is received from the one or more target devices having the same ID in response to the updated call parameter; determining whether overlapping IDs exist among updated IDs of the one or more target devices based on a number of the at least one response signal, when the at least one response signal is received; and assigning a control ID to a target device that transmits a response signal when the number of the updated IDs of the target devices is one and the overlapping IDs are absent among the updated IDs of the one or more target devices.

According to a yet another general aspect, an anti-collision method in wireless power transmission may include: receiving an access standard instruction including an access standard to be used for identifying one or more target devices; generating an ID of a target device, based on values set in a reference field, call argument field, and a movement argument field included in the access standard instruction; receiving a call parameter generated based on the value set in the call argument field; comparing the ID and the call parameter; transmitting, to a source device, a response signal in response to the call parameter, when the ID has the same value as the call parameter; and assigning, from the source device, a control ID.

The method may further include: receiving, from the source device, an updated access standard instruction, which is updated by changing a value set in the movement argument field, when the source device determines, based on at least one response signal, that one or more devices having the same ID exists; and updating the ID of the target device, based on the updated access standard instruction.

The method may further include: receiving an updated call parameter, based on a number of the one or more target devices having the same ID; comparing the updated ID and the updated call parameter; transmitting, to the source device, a response signal in response to the updated access standard instruction when the updated ID has the same value as the updated call parameter; and receiving a control ID from the source device.

According to a further general aspect, an anti-collision apparatus in wireless power transmission may include: a communication unit configured to transmit, from a source device to one or more target devices sensed during a predetermined time, a call parameter and an access standard instruction including an access standard to be used for identifying the one or more target devices, and to receive at least one response signal from the one or more target devices in response to the call parameter; and a controller configured to determine the call parameter based on the access standard instruction, and to assign control identifications (IDs) to the one or more target devices, based on the at least one response signal from the one or more target devices in response to the call parameter.

The apparatus may further include: a power converter configured to generate a wake-up power to be used by the one or more target devices, based on a system information area of the source device.

The controller may control transmission of wireless power, data or both to the one or more target devices that receive the control IDs.

According to an even further aspect, an anti-collision apparatus in wireless power transmission may include: a target resonator configured to receive, from a source device, a wake-up power to be used for communication; a communication unit configured to receive an access standard instruction including an access standard to be used for identifying one or more target devices, a call parameter generated based on the access standard instruction, and a control ID to be used for identifying the one or more devices, and to transmit a response signal to the source device in response to the call parameter when an ID of a target device has the same value as the call parameter; and a controller configured to generate an ID of a target device, based on values set in a reference field included in the access standard instruction, a call argument field, and a movement argument field, and to determine whether the ID has the same value as the call parameter.

Then the control ID is received, the communication unit may transmit an acknowledgement (ACK) signal in response to the reception.

The IDs of the one or more target devices may be temporary IDs.

Other features and aspects may be apparent from the following detailed description, the drawings, and the claims.

BRIEF DESCRIPTION OF THE DRAWINGS

FIGS. 4A and 4B are diagrams illustrating basic formats of an access standard instruction.

FIG. 5 is a diagram illustrating a basic format of an identification (ID) assignment instruction.

FIG. 6 is a diagram illustrating a basic format of an acknowledgement (ACK) response instruction of a target device.

FIG. 15 is a diagram illustrating a structure of a system information area of a source.

FIG. 16 is a diagram illustrating a structure of a system information area of a target.

FIG. 17 illustrates an electric vehicle charging system.

Figure 1:
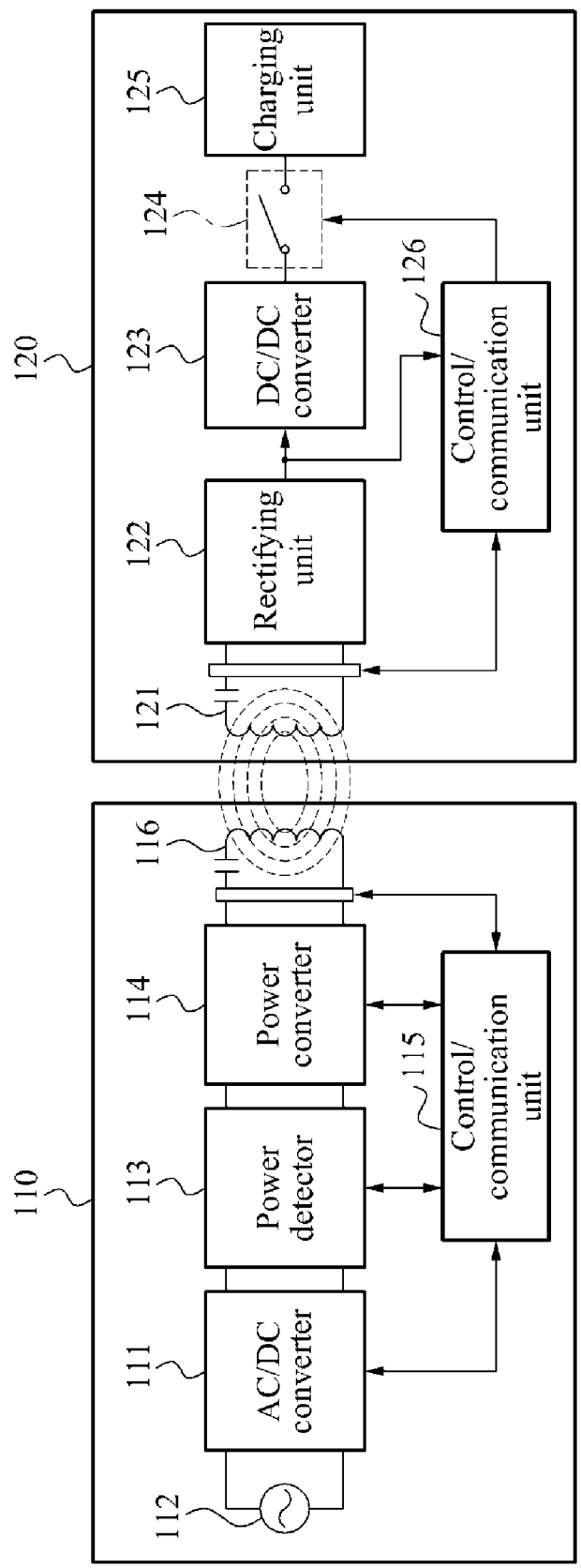
FIG. 1 is a diagram illustrating a wireless power transmission system.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates a wireless power transmission system.

As shown, the wireless power transmission system includes a source device 110 and a target device 120.

The source device 110 may include an alternating current-to-direct current (AC/DC) converter 111, a power detector 113, a power converter 114, a control/communication unit 115, and a source resonator 116.

The target device 120 may include a target resonator 121, a rectifying unit 122, a DC-to-DC (DC/DC) converter 123, a switch unit 124, a charging unit 125, and a control/communication unit 126.

The AC/DC converter 111 may be configured to output DC voltage of a predetermined level, and/or may adjust an output level of DC voltage based on the control of the control/communication unit 115.

The power detector 113 may detect current and voltage output from the AC/DC converter 111, and may transfer, to the control/communication unit 115, information on the detected current and the detected voltage. The power detector 113 may detect current and voltage input to the power converter 114.

The power converter 114 may be configured to generate power by converting DC voltage of a predetermined level to AC voltage, for example, using a switching pulse signal in a band of a few megahertz (MHz) to tens of MHz. The power converter 114 may convert the DC voltage to AC voltage using a resonance frequency and thus, may generate a communication power to be used for communication or a charging power to be used for charging used in the target device 120. The communication power to be used for communication may correspond to energy for activating a processor and a communication module of the target device 120. The communication power to be used for communication may be referred to as a "wake-up power" in terms of the energy for activating a processor and a communication module of the target device 120. The communication power to be used for communication may be transmitted in a form of a constant wave during a predetermined time. The charging power used for charging may correspond to energy for charging a battery connected to or included in the target device 120. The "charging power" may be continuously transmitted during a predetermined time, and may be transmitted at a power level greater than the communication power used for communication. For example, a power level of the communication power to be used for communication may be 0.1 to 1 Watt (W), and a power level of the charging power used for charging may be 1 to 20 W.

The control/communication unit 115 may control the frequency of a switching pulse signal. The frequency of the switching pulse signal may be determined based on the control of the control/communication unit 115. By controlling the power converter 114, the control/communication unit 115 may generate a modulated signal to be transmitted to the target device 120. The control/communication unit 115 may transmit various messages to the target device 120, through in-band communication. The control/communication unit 115 may detect a reflected wave, and may demodulate a signal received from the target device 120 through an envelope of the detected reflected wave.

The term "in-band" communication(s), as used herein, means communication(s) in which information (such as, for example, control information, data and/or metadata) is transmitted in the same frequency band, and/or on the same channel, as used for power transmission. According to one or more embodiments, the frequency may be a resonance frequency. And, the term "out-band" communication(s), as used herein, means communication(s) in which information (such as, for example, control information, data and/or metadata) is transmitted in a separate frequency band and/or using a separate or dedicated channel, than used for power transmission.

The control/communication unit 115 may generate a modulated signal for in-band communication, using various schemes. To generate the modulated signal, the control/communication unit 115 may turn a switching pulse signal ON and OFF, and/or may perform delta-sigma modulation. Additionally, the control/communication unit 115 may generate a pulse-width modulated (PWM) signal having a predetermined envelope.

The control/communication unit 115 may perform out-band communication using a communication channel, as opposed to using a resonance frequency. The control/communication unit 115 may include a communication module, such as one configured to process ZigBee, Bluetooth, Wi-Fi, Wi-Max communications and the like. The control/communication unit 115 may perform transmission and reception of data with the target device 120, through out-band communication.

The source resonator 116 may transfer electromagnetic energy to the target resonator 121. The source resonator 116 may transfer, to the target device 120, a communication power to be used for communication or a charging power to be used for charging through magnetic coupling with the target resonator 121.

The target resonator 121 may receive the electromagnetic energy from the source resonator 116. The target resonator 121 may receive, from the source device 110, the communication power to be used for communication or the charging power to be used for charging through magnetic coupling with the source resonator 116. The target resonator 121 may receive various messages from the source device 110 through in-band communication.

The rectifying unit 122 may generate DC voltage by rectifying AC voltage which may be received by the target resonator 121.

The DC/DC converter 123 may adjust a level of the DC voltage output from the rectifying unit 122, based on a capacity of the charging unit 125. For example, the DC/DC converter 123 may adjust the level of the DC voltage output from the rectifying unit 122, from 3 to 10 V.

The switch unit 124 may be turned ON and OFF based on the control of the control/communication unit 126. When the switch unit 124 is turned OFF, the control/communication 115 of the source device 110 may detect a reflected wave and the magnetic coupling between the source resonator 116 and the target resonator 121 may be eliminated.

The charging unit 125 may include at least one battery. The charging unit 125 may charge the at least one battery using DC voltage output from the DC/DC converter 123.

The control/communication unit 126 may perform in-band communication for transmitting and receiving data using a resonance frequency. For example, the control/communication unit 126 may demodulate a received signal by detecting a signal between the target resonator 121 and the rectifying unit 122, and/or by detecting an output signal of the rectifying unit 122. The control/communication unit 126 may demodulate a message received through the in-band communication.

The control/communication unit 126 may adjust an impedance of the target resonator 121 so as to modulate a signal to be transmitted to the source device 110. The control/communication unit 126 may modulate the signal to be transmitted to the source device 110, by turning the switch unit 124 ON and OFF. For example, the control/communication unit 126 may increase the impedance of the target resonator 121 so that a reflected wave may be detected from the control/communication unit 115 of the source device 110. Depending on whether the reflected wave is detected, the control/communication unit 115 may detect a binary value (e.g., "0" or "1").

The control/communication unit 126 may perform outband communication using a communication channel. The control/communication unit 126 may include a communication module, such as one configured to process Zigbee, Bluetooth, Wi-Fi, and Wi-max communications and the like. The control/communication 126 may perform transmission and reception of data with the source device 110.

Figure 2:
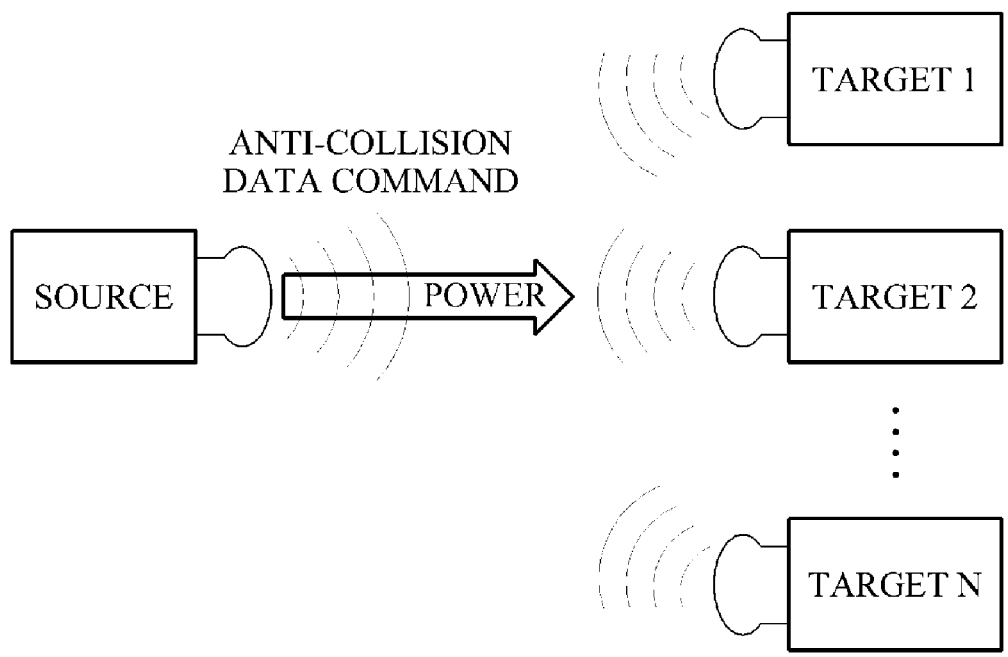
FIG. 2 is a diagram illustrating an operational environment of a wireless power transmission system.

FIG. 2 illustrates an operational environment of a wireless power transmission system.

Referring to FIG. 2, the wireless power transmission system may transmit wireless power through magnetic coupling between a source resonator and a target resonator.

The wireless power transmission system may have one source and a plurality of targets. The source may transmit power to targets including a target 1 through a target N placed in a wireless power transmission area of the source. When the target 1 through the target N are placed in the wireless power transmission area at predetermined time intervals, the source may sequentially access the targets in an order of placement.

And if the targets (e.g., target 1 through the target N) are simultaneously placed in the wireless power transmission area, the source may need to identify the target 1 through the target N, respectively, so as to transmit power, data or both to the targets 1 through the target N, respectively. However, when the source performs data transmission without identifying the target 1 through the target N, a collision may possibly occur.

A process of identifying the plurality of targets through communication between the source and the plurality of targets will be described in detail.

Figure 3:
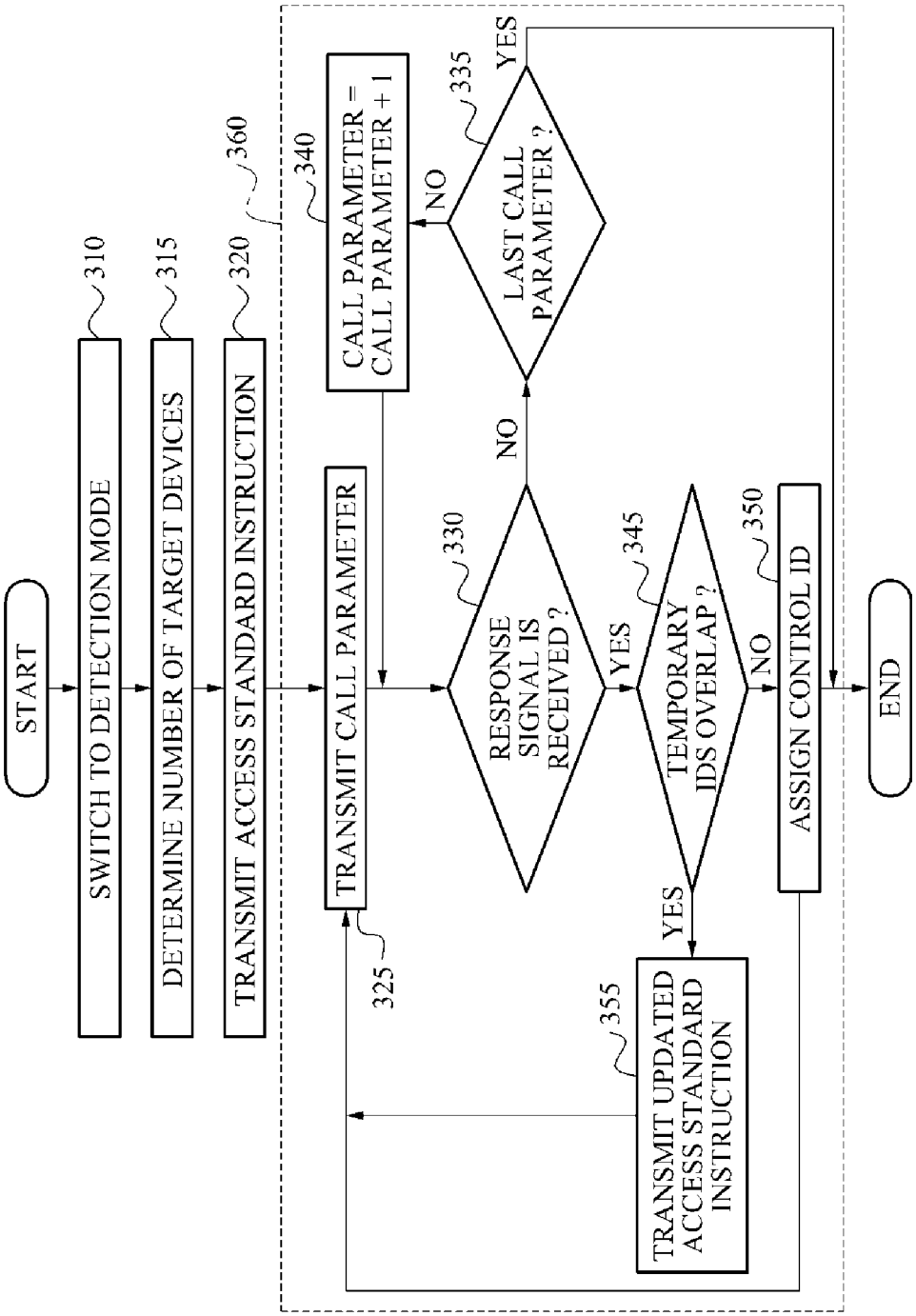
FIG. 3 is a flowchart illustrating an anti-collision method in wireless power transmission.

FIG. 3 illustrates an anti-collision method in wireless power transmission.

A source may include a source device, for instance. The source device may be a device supplying wireless power, which includes all sort of electrical devices that provide power, for example, pads, terminals, television (TV), and the like. A target device may be a device receiving wireless power, and may include an assortment of electronic devices that consume power.

In operation 310, the source may sense a plurality of target devices. The source may continuously check approach of target devices, for example. In some instances, the source may measure a change in impedance as the target devices approach a wireless power transmission area and thus, may sense the plurality of target devices. The source may sense the approach of the plurality of target devices using various sensors, for example, a pressure sensor, a temperature sensor, and the like.

In operation 315, the source may transmit a wake-up power to the plurality of sensed target devices. For example, the wake-up power may be power to be used for performing basic communication between a target device and a source device. By receiving the wake-up power, the target device may receive a signal from the source and may transmit a corresponding response signal.

In operation 320, the source may transmit an access standard instruction to the plurality of sensed target devices. The source may transmit the access standard instruction a predetermined time after transmitting the wake-up power to the plurality of sensed target devices. The access standard instruction may include a reference point field, a call argument field, and a movement argument field. A value set in the reference point field may denote a reference point to be used for generating a temporary ID from a unique ID of a target device. When there is an agreement between the source and the target device about the reference point, a reference point field may be omissible in the access standard instruction. And when the source and the target device determine a most significant bit (MSB) or a least significant bit (LSB) among unique ID bits as the reference point in advance, the reference point field may be omissible in the access standard instruction.

A value set in the call argument field may denote predetermined consecutive n bits from the reference point and a value set in the movement argument field may denote a number of bits corresponding to movement of the reference point.

The target devices may generate, based on an access standard, respective temporary IDs based on portions of their unique IDs, respectively.

In operation 325, the source may transmit a call parameter to the plurality of sensed target devices. The call parameter may be determined based on a call argument included in the access standard instruction. For example, if the call argument is 3 bits, the call parameter may be determined to be a value in a range from "000" to "111." The source may sequentially transmit the call parameter having a value in a range from "000" to "111" to the plurality of sensed target devices. The source may transmit a call parameter having a value in a range from "111" to "000." The source may transmit, to the plurality of sensed target devices, an instruction corresponding to the call parameter. For example, the instruction corresponding to the call parameter may be an instruction used for calling a temporary ID of a target device.

In operation 330, the source may determine whether at least one response signal is received from the plurality of sensed target devices. A target device may transmit a response signal to the source when a received call parameter has the same value as a temporary ID of the target device. For example, the response signal may be an acknowledgement (ACK) signal. The source may obtain information associated with the temporary ID of the target device, by receiving the response signal.

In operation 335, when the source does not receive the at least one response signal from the plurality of sensed target devices, the source may determine whether the transmitted call parameter is a last call parameter. The source may complete the procedure when the transmitted call parameter is the last parameter. For example, when the call argument is 3 bits, the source may transmit a call parameter having a value in a range from "000" to "111." The value "111" may correspond to the last call parameter, for example. When the transmitted call parameter is the last call parameter, the source may consider the plurality of sensed target devices to be devices that do not need to be charged or devices that are not compatible with the source.

In operation 340, when the transmitted call parameter is not the last call parameter, the source may change the call parameter by 1 bit so as to update the call parameter. The source may transmit the updated call parameter to the plurality of sensed target devices. For example, since the last call parameter is "111," when the call parameter before update is "010" the source may change the call parameter by 1 bit so as to update the call parameter to "011." The source may transmit the updated call parameter having a value of "011" to the plurality of sensed target devices.

In operation 345, when the source receives the at least one response signal from the plurality of sensed target devices, the source may determine whether overlapping temporary IDs exist among temporary IDs of the plurality of sensed target devices based on a number of the at least one response signal. When the source receives a plurality of response signals during a predetermined time after transmitting the call parameter, the source may determine that overlapping temporary IDs exist among the temporary IDs of the plurality of sensed target devices.

In operation 350, when the source receives a single response signal, the source may determine that overlapping temporary IDs are absent among the temporary IDs of the plurality of sensed target devices and thus, the source may assign a control ID to a target device that transmits the response signal. The control ID may denote an ID that a source assigns to a target device so as to independently control the target device. The source may independently control the target device to which the control ID is assigned. For example, the source may transmit power to the target device to which the control ID is assigned, and may perform transmission and reception of data with the target device. Subsequently, the source may transmit a call parameter until the source completes assigning control IDs to all devices of the plurality of sensed target devices. And the call parameter may be updated from an existing call parameter for every transmission.

In operation 355, when overlapping temporary IDs exist among the temporary IDs of the plurality of target devices, the source may transmit an updated access standard instruction to a plurality of target devices having the same temporary ID. The source may update the access standard instruction by changing at least one of the reference point, the call argument, and the movement argument. The plurality of target devices having the same temporary ID may update their temporary IDs based on the updated access standard instruction.

The source may transmit an updated call parameter to the plurality of target devices having the same temporary ID, in the same manner as an operation in operation 325. For instance, the source may repeat the operations in 325 through 355 until the source completes assigning of control IDs to all devices of the plurality of sensed target devices.

Figure 4A:
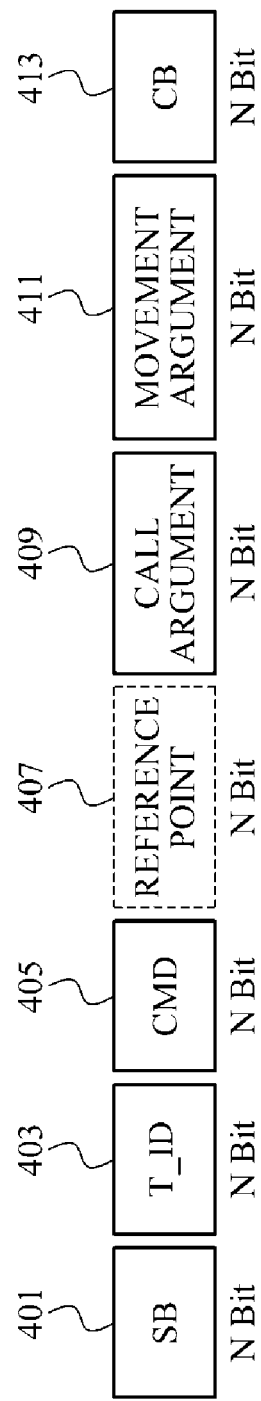

FIGS. 4A and 4B illustrate basic formats of an access standard instruction.

FIG. 4A illustrates fields included in an access standard instruction. The access standard instruction may include, for example, a start bit (SB) field 401, a target ID (T_ID) field 403, a command (CMD) field 405, a reference point field 407, a call argument field 409, a movement argument field 411, and a check bit (CB) field 413. Not all fields may be used in all embodiments, and additional or alternative fields may be provided, in some embodiments.

A target device may receive an access standard through the access standard instruction, and may generate information used to identify the target device.

The SB field 401 may include a bit-type identifier indicating a beginning of a packet. For example, N bits may be assigned to the SB field 401 based on a size of the entire packet.

The T_ID field 403 may include a control ID when the control ID is assigned to a target device. The T_ID field 403 may include a null value when a control ID is not assigned to the target device.

The CMD field 405 may include an instruction used to define an operation of a source. The instruction may include, for example, an instruction to reset, an instruction to request an input voltage and input current of a target device, an instruction to request an output voltage and output current of a DC-to-DC converter of a target device, an instruction to send an ACK, an instruction to request a load of a target device to be powered on, an instruction to request a load of a target device to be powered off, an instruction to request state information associated with a target device, an instruction to transfer an access standard, an instruction to send a negative acknowledge (NACK), an instruction to assign a control ID, an instruction to request registration information of a target device, and the like. Additionally, a code may be assigned to each instruction. In some instances, the CMD field 405 may include the access standard instruction. Various bits may be assigned to the CMD field 405 based on a number of instructions.

The reference point field 407 may include a reference point. For instance, the reference point may refer to a reference used to create a temporary ID of a target device from a unique ID of the target device. The reference point may be, for example, an MSB or an LSB among bits of the unique ID of the target device. Additionally, the reference point may represent a predetermined position of the unique ID of the target device. If a reference point is agreed to in advance between a source and a target device, the reference point field 407 may be omitted from the access standard instruction. And if an MSB or an LSB among bits of a unique ID of a target device is set as a reference point in advance, the reference point field 407 may also be omitted from the access standard instruction. As illustrated in FIG. 4A, the reference point field 407 is denoted by a dotted line box, because the reference point field 407 may be omissible from the access standard instruction.

The call argument field 409 may include a call argument. The call argument may indicate n consecutive bits from the reference point. A call parameter may be a value used when a source calls predetermined bits from a target device. The call parameter may be determined based on the call argument. For example, when the call argument is set to "3," the call parameter may have a value in a range from "000" to "111."

The movement argument field 411 may include a movement argument. The movement argument may indicate a number of bits corresponding to movement of the reference point and may indicate how much the reference point moves. For example, when the movement argument is set to "1," the reference point may move to the right or the left by 1 bit. A number of bits assigned to the movement argument field 411 may be adjusted based on a size of the entire packet.

The CB field 413 may include a check bit used to verify accurate transmission of a packet.

Additionally, the access standard instruction may include various fields, in addition to the reference point field 407, the call argument field 409, and the movement argument field 411. For example, the access standard instruction may include various fields assigned in bits or bytes.

FIG. 4B illustrates, in detail, the reference point field 407, the call argument field 409, and the movement argument field 411. The reference point may be set in the reference point field 407. For instance, if a reference point is set to an MSB, "M" or "1" may be set in a reference point field, as illustrated in FIG. 4B. And if a reference point is set to an LSB, "L" or "0" may be set in the reference point field, as illustrated in FIG. 4B. Additionally, the call argument may be set in the call argument field 409. The call argument may be determined based on a number of sensed target devices, and may have a value in a range from "1" to "n," as illustrated in FIG. 4B. The movement argument may be set in the movement argument field 411. The movement argument may be determined based on the number of the sensed target devices, and may have a value in a range from "0" to "n," as illustrated in FIG. 4B.

FIG. 5 illustrates one basic format of an ID assignment instruction.

Referring to FIG. 5, the ID assignment instruction includes an SB field 510, a control ID (T_No) field 520, a CMD field 530, and a CB field 540. Not all fields may be used in all embodiments, and additional or alternative fields may be provided, in some embodiments.

The SB field 510 may include a bit-type identifier indicating the beginning of a packet. For example, N bits may be assigned to the SB field 510 based on a size of the entire packet.

The T_No field 520 may include a control ID assigned by a source to a target device. Based on the control ID of the T_No field 520, the target device may acquire an ID that enables the target to independently communicate with the source.

The CMD field 530 may include an instruction that defines an operation of the source. FIG. 5 illustrates the ID assignment instruction and thus, the CMD field 530 may include the ID assignment instruction. In some instances, a code may be assigned to the instruction.

The CB field 540 may include a check bit used to verify accurate transmission of a packet.

Additionally, the ID assignment instruction may include various fields, in addition to the SB field 510, the T_No 520, the CMD field 530, and the CB field 540. For example, the ID assignment instruction may include various fields assigned in bits or bytes.

FIG. 6 illustrates one basic format of an ACK response instruction of a target device.

Referring to FIG. 6, a response instruction includes a preamble (PA) field 610, a start code (SC) field 620, a CMD field 630, and a cyclic redundancy checking (CRC)-5 field 640. Not all fields may be used in all embodiments, and additional or alternative fields may be provided, in some embodiments.

The PA field 610 may include dummy data that is randomly transmitted to prevent a loss of a wireless packet.

The SC field 620 may include an identifier indicating the beginning of a shortened packet, when the response instruction includes four fields, for example, the PA field 610, the SC field 620, the CMD field 630, and the CRC-5 field 640. In a general packet, an address field of a transmitter, an address field of a receiver, a data field, and the like may be further included in the response instruction, for instance.

The CMD field 630 may include an instruction used to define an operation of the target device. The instruction may include, for example, a instruction to reset, an instruction to respond to an input voltage and input current of a target device, an instruction to respond to voltage and current output from a DC-to-DC converter of a target device, an instruction to send an ACK, an instruction to respond to state information of a target device, an instruction to respond to registration information of a target device, and the like. Additionally, a code may be assigned to each instruction. In some instances, the CMD field 630 may include the ACK response instruction.

The CRC-5 field 640 may include a CRC code used to verify accurate transmission of a packet.

Figure 7:
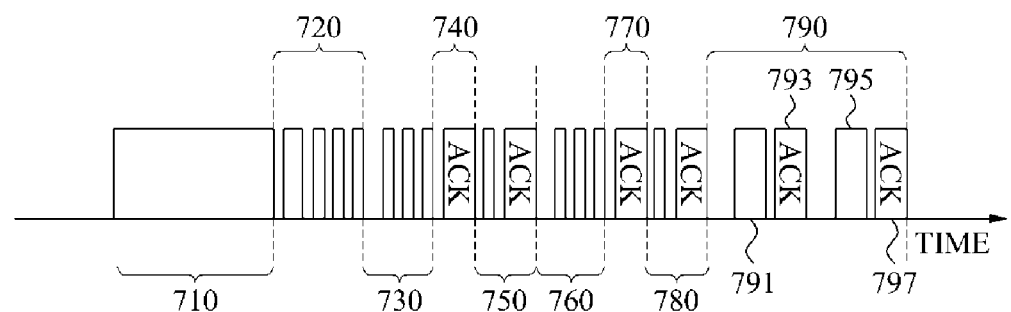
FIG. 7 is a diagram illustrating operations of a source device and target devices for each time slot, to avoid collision when two target devices exist.

FIG. 7 illustrates operations of a source and target devices for each time slot, to avoid collision when two target devices exist. In various embodiments, the source may simultaneously detect the two target devices. The two target devices may be, for example a first target device and a second target device.

Referring to FIG. 7, in a period 710, the source may transmit a wake-up power to the two target devices. The wake-up power may be used to operate controllers of the two target devices. The controllers may operate by receiving the wake-up power, so that a condition for performing transmission and reception with the source may be satisfied.

An amount of the wake-up power may be determined based on information associated with the maximum number of target devices that the source device is able to transmit power to, the information being stored in a system information area of a source illustrated in FIG. 15.

In a period 720, the source may transmit an access standard instruction to the two target devices. In response to the access standard instruction, the first target device and the second target device may create their respective temporary IDs based on an access standard. To create the temporary IDs, portions of unique IDs of the first target device and the second target device may be used, respectively. For example, the unique IDs of the two target device may be a serial number or a short ID as illustrated in FIG. 16.

In a period 730, the source may transmit a call parameter to the two target devices. The call parameter may be determined based on a call argument included in the access standard instruction. For example, when the call argument is set to 3 bits, the call parameter may have a value in a range from "000" to "111."

In a period 740, the first target device may transmit, to the source, a response signal in response to the call parameter. When the temporary ID of the first target device is identical to the call parameter, the first target device may transmit the response signal.

In a period 750, the source may assign a control ID to the first target device. The control ID may be set to "1." The first target device with the control ID may transmit, to the source, an ACK signal stating that the assigned control ID is received.

In a period 760, the source may continue to transmit another call parameter to the two target devices. The source may continue to transmit, to the two target devices, the other call parameter subsequent to the call parameter transmitted in the period 730.

In a period 770, the second target device may transmit, to the source, a response signal in response to the call parameter transmitted in the period 760.

In a period 780, the source may assign a control ID to the second target device. The control ID may be set to "2." The second target device with the control ID may transmit, to the source, an ACK signal stating that the assigned control ID is received.

In a period 790, the source may individually transmit a control instruction to the first target device and the second target device to which the control IDs are respectively assigned. The control instruction may include, for example, a charging instruction, a reset instruction, an instruction to check an operation status of a target device, an instruction to request temperature information of a target device, an instruction to request registration information of a target device, and the like.

Figure 8:
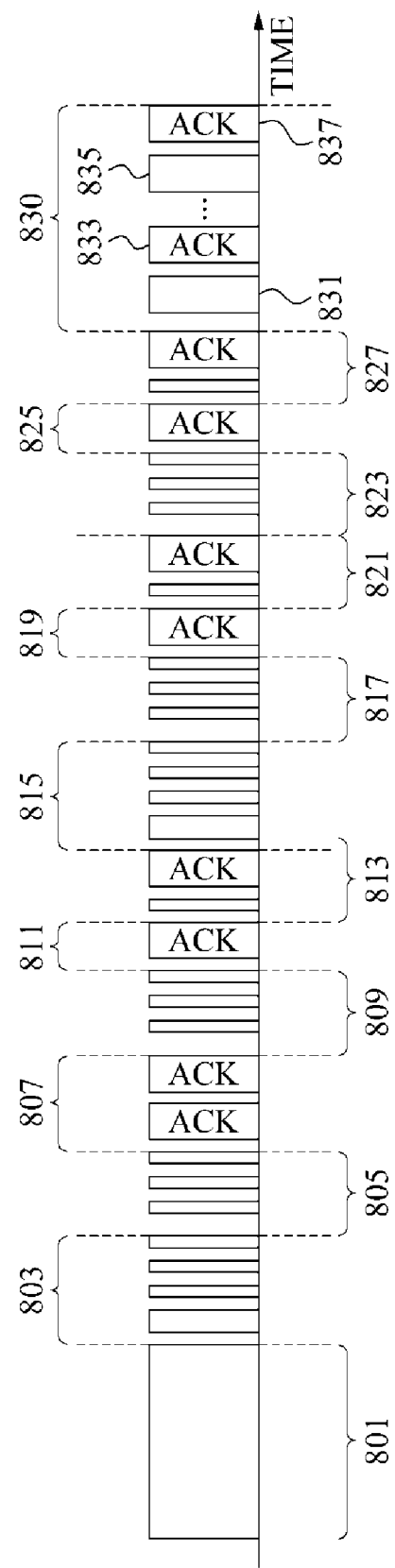
FIG. 8 is a diagram illustrating operations of a source device and target devices for each time slot, to avoid collision when three target devices exist.

In a time slot 791, the source may transmit a first control instruction to control the first target device. In a time slot 793, the first target device may transmit a response signal in response to the first control instruction. In a time slot 795, the source may transmit a second control instruction to control the second target device. In a time slot 797, the second target device may transmit a response signal in response to the second control instruction. FIG. 8 illustrates operations of a source device and target devices for each time slot, to avoid collision when three target devices exist. In various embodiments, the source may simultaneously detect the three target devices. The three target devices may be, for example a first target device, a second target device, and a third target device.

Referring to FIG. 8, in a period 801, the source may transmit a wake-up power to the three target devices. The wake-up power may be used to operate controllers of the three target devices. The controllers may operate by receiving the wake-up power, so that a condition for transmitting or receiving data to or from the source may be satisfied.

In a period 803, the source may transmit an access standard instruction to the three target devices. In response to the access standard instruction, the three target devices may create their respective temporary IDs based on an access standard. To create the temporary IDs, portions of unique IDs of the three target devices may be used, respectively. For example, the unique IDs of the three target devices may be a serial number or a short ID as illustrated in FIG. 16.

In a period 805, the source may transmit a first call parameter to the three target devices. The first call parameter may be determined based on a call argument included in the access standard instruction. For example, when the call argument is set to 2 bits, the call parameter may have a value in a range from "00" to "11."

In a period 807, the first target device and the second target device may transmit, to the source, response signals in response to the first call parameter, respectively. When the temporary ID of the first target device, and the temporary ID of the second target device are identical to the first call parameter, the first target device and the second target device may transmit the response signals. Since the two response signals are received, the source may determine that the first target device and the second target device collide.

In a period 809, the source may continue to transmit a second call parameter to the three target devices. The source may continue to transmit, to the three target devices, the second call parameter subsequent to the first call parameter transmitted in the period 805.

In a period 811, the third target device may transmit, to the source, a response signal in response to the second call parameter transmitted by the source in the period 809. When the temporary ID of the third target device is identical to the second call parameter, the third target device may transmit the response signal. Conversely, when the temporary ID of the third target device is different from the second call parameter, the third target device may not transmit a response signal.

In a period 813, the source may assign a control ID to the third target device. The control ID may be set to "1." The third target device with the control ID may transmit, to the source, an ACK signal stating that the assigned control ID is received.

In a period 815, the source may transmit another access standard instruction to the first target device and the second target device that collide with each other. In some instances, the access standard instruction may include a movement argument field. The source may change a value set in the movement argument field, to identify the first target device and the second target device, so that a new access standard may be agreed between the source and the first target device and the second target device. Additionally, the source may generate a new access standard instruction by changing a value set in a reference point field, or a value set in a call argument field. The first target device and the second target device may receive the new access standard instruction, and may update their respective temporary IDs based on the new access standard.

In a period 817, the source may transmit a third call parameter to the first target device and the second target device. The third call parameter may be determined based on a call argument included in the new access standard instruction. Additionally, the call argument may be determined based on a number of target devices sensed by the source. For example, when three target devices are sensed, the call argument may be set to a value equal to or greater than 2 bits, to identify the three target devices.

In a period 819, the first target device may transmit, to the source, a response signal in response to the third call parameter transmitted by the source in the period 817. When the updated temporary ID of the first target device is identical to the third call parameter, the first target device may transmit the response signal.

In a period 821, the source may assign a control ID to the first target device. The control ID may be set to "2." The first target device with the control ID may transmit, to the source, an ACK signal stating that the assigned control ID is received.

In a period 823, the source may continue to transmit a fourth call parameter to the second target device. The source may continue to transmit, to the second target device, the fourth call parameter subsequent to the third call parameter transmitted in the period 817.

In a period 825, the second target device may transmit, to the source, a response signal in response to the fourth call parameter transmitted by the source in the period 823. When the updated temporary ID of the second target device is identical to the fourth call parameter, the second target device may transmit the response signal.

In a period 827, the source may assign a control ID to the second target device. The control ID may be set to "3." The second target device with the control ID may transmit, to the source, an ACK signal stating that the assigned control ID is received.

In a period 830, the source may individually transmit a control instruction to the first target device, the second target device, and the third target device to which the control IDs are respectively assigned. The control instruction may include, for example, an instruction for charging, an instruction to reset, an instruction to check an operation status of a target device, an instruction to request temperature information of a target device, an instruction to request registration information of a target device, and the like. In a time slot 831, the source may transmit a first control instruction to control the third target device. In a time slot 833, the third target device may transmit a response signal in response to the first control instruction. In a time slot 835, the source may transmit a second control instruction to control the second target device. In a time slot 837, the second target device may transmit a response signal in response to the second control instruction.

Figure 9:
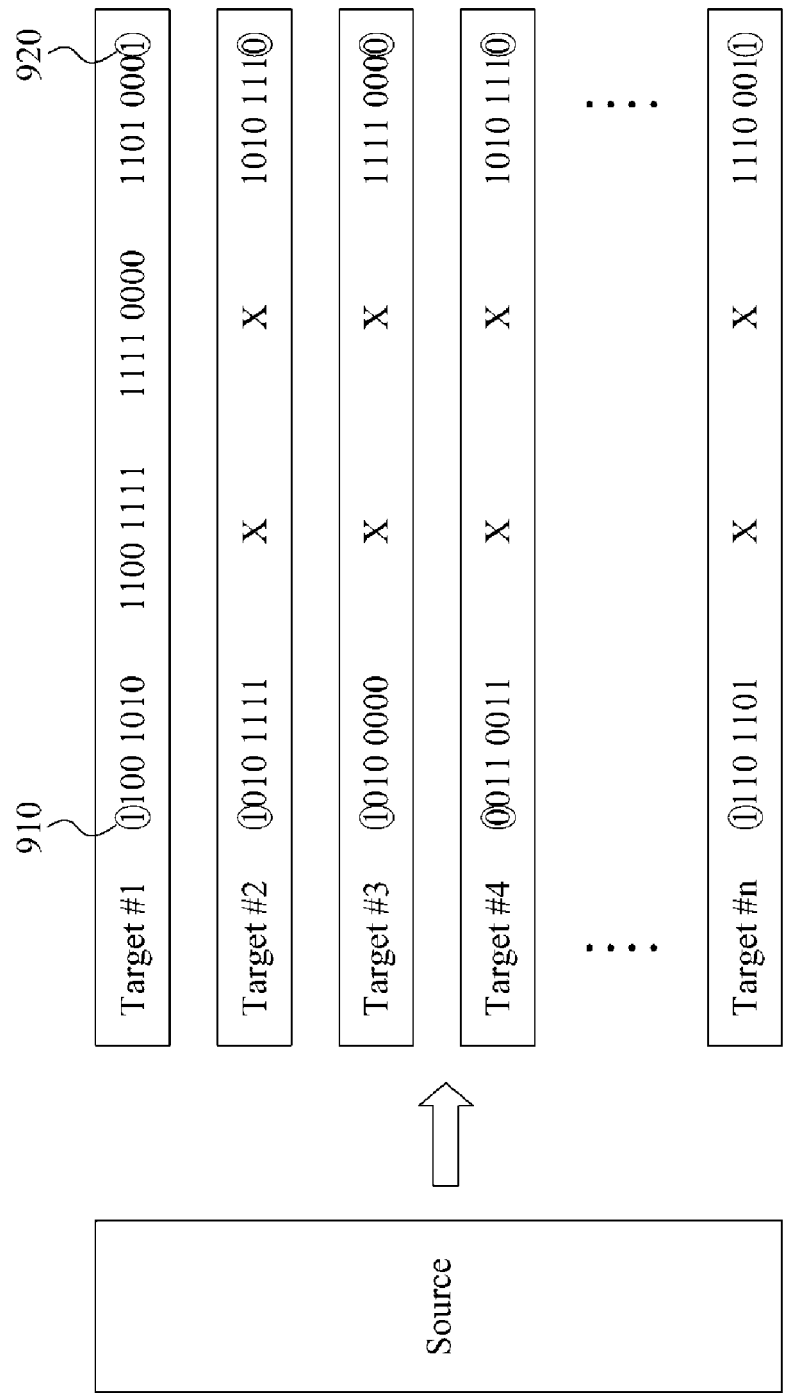
FIG. 9 is a diagram illustrating a reference point in an operation of identifying target devices to avoid collision.

FIG. 9 illustrates a reference point in an operation of identifying target devices to avoid collision.

A source may transmit an access standard instruction to a plurality of target devices. The access standard instruction may include a reference point field. A value set in the reference point field may indicate a reference point, and the reference point may refer to a reference used to create a temporary ID of a target device from a unique ID of the target device. The reference point may include, for example, an MSB or an LSB among bits of the unique ID of the target device. For example, the unique ID of the target device may be a serial number or a short ID as illustrated in FIG. 16.

As an example, as illustrated in FIG. 9, an MSB 910, or an LSB 920 may be set as a reference point of a first target device. For example, an access standard instruction may be transmitted to n target devices and accordingly, the reference point may equally be applied to the n target devices. And if the reference point of the first target device is set to the MSB 910, a reference point of a second target device may also be set to the MSB 910, not the LSB 920.

Figure 10:
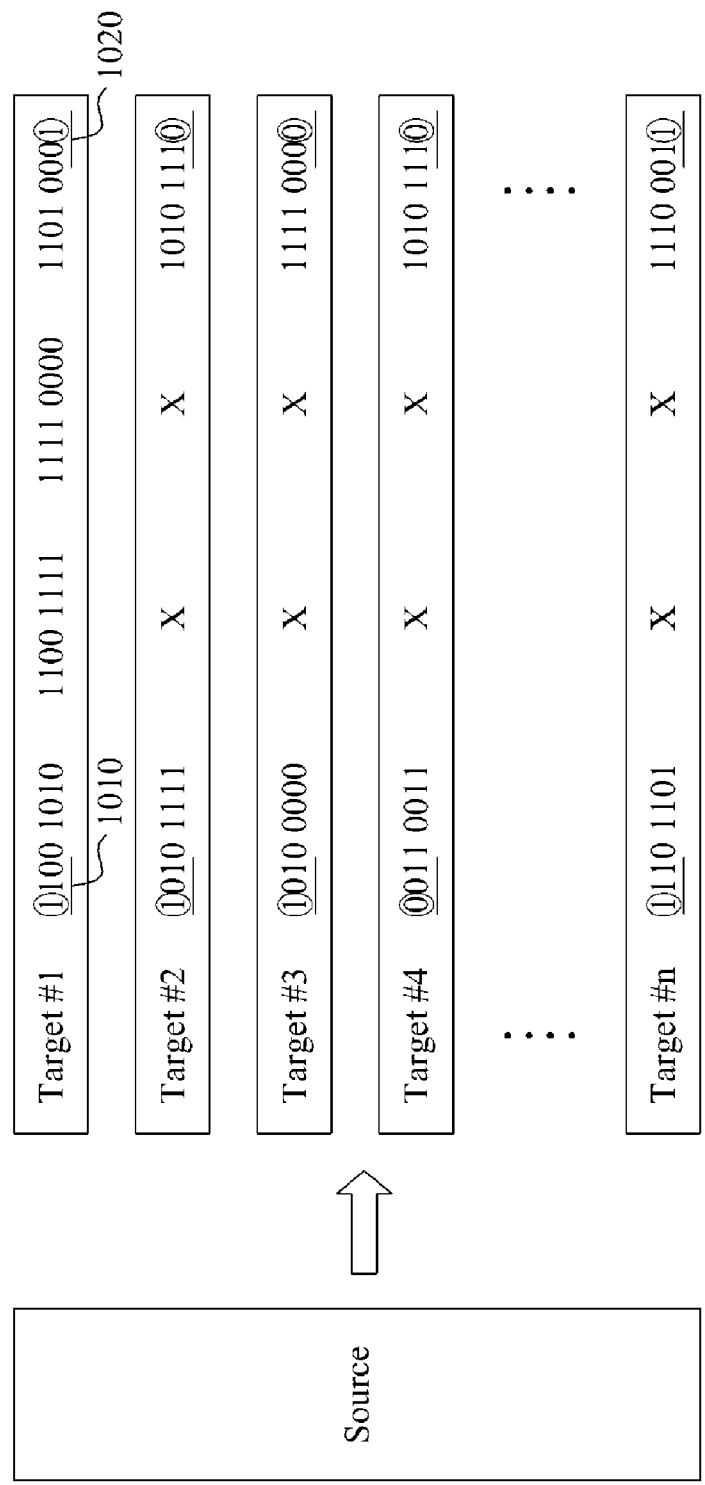
FIG. 10 is a diagram illustrating a call argument and a call parameter in an operation of identifying target devices to avoid collision.

FIG. 10 illustrates a call argument and a call parameter in an operation of identifying target devices to avoid collision.

A source may transmit an access standard instruction to a plurality of target devices. The access standard instruction may include a call argument field. A value set in the call argument field may indicate a call argument, and the call argument may refer to n consecutive bits from a reference point. The call argument may be determined based on a number of target devices sensed by the source. For example, when five target devices are sensed, a call argument may be set to a value equal to or greater than 3, since eight cases represented by 3 bits may be identified. Additionally, a call parameter may be used to call a predetermined bit from a target device. The call parameter may be determined based on the call argument. For example, when the call argument is set to 3 bits, the call parameter may have a value in a range from "000" to "111."

As illustrated in FIG. 10, the call argument may be set to "3." Accordingly, the source may call three consecutive bits from a reference point. For example, the source may call three consecutive bits, rightward from an MSB of a unique ID of a target device. Also, the source may call three consecutive bits, leftward from an LSB of the unique ID of the target device. For example, the unique ID of the target device may be a serial number or a short ID as illustrated in FIG. 16.

Referring to FIG. 10, when the MSB is set as a reference point, the source may call three bits "110" 1010 from a first target device. Additionally, when the LSB is set as a reference point, the source may call three bits "001" 1020 from the first target device. Since the access standard instruction may equally be applied to n target devices, the call argument may need to be equally applied to the n target devices.

Figure 11:
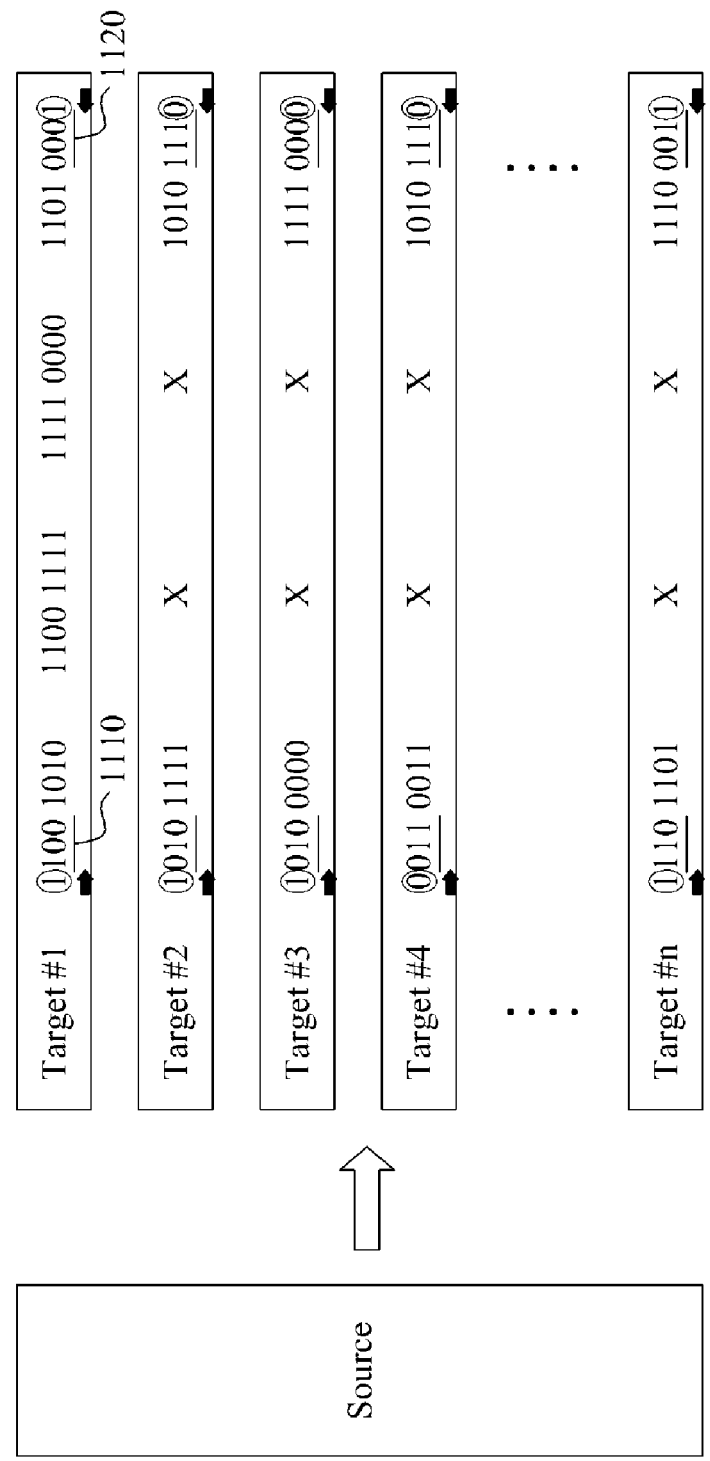
FIG. 11 is a diagram illustrating a movement argument in an operation of identifying target devices to avoid collision.

FIG. 11 illustrates a movement argument in an operation of identifying target devices to avoid collision.

A source may transmit an access standard instruction to a plurality of target devices. The access standard instruction may include a movement argument field. A value set in the movement argument field may indicate a movement argument, and the movement argument may refer to a number of bits corresponding to movement of the reference point. The movement argument may indicate the number of bits by which the reference point moves. For example, when the movement argument is set to "1," the reference point may move to the right or the left by 1 bit.

Referring to FIG. 11, the movement argument may be set to "1." Accordingly, a reference point may move to the right or the left by 1 bit. When an MSB is set as a reference point, the reference point may move to the right by 1 bit, based on the movement argument. For example, the source may call three bits "100" 1110 from a first target device. And if an LSB is set as a reference point, the reference point may move to the left by 1 bit, based on the movement argument. For example, the source may call three bits "000" 1120 from the first target device. Since the access standard instruction may equally be applied to n targets, the call argument may need to be equally applied to the n targets.

Figure 12:
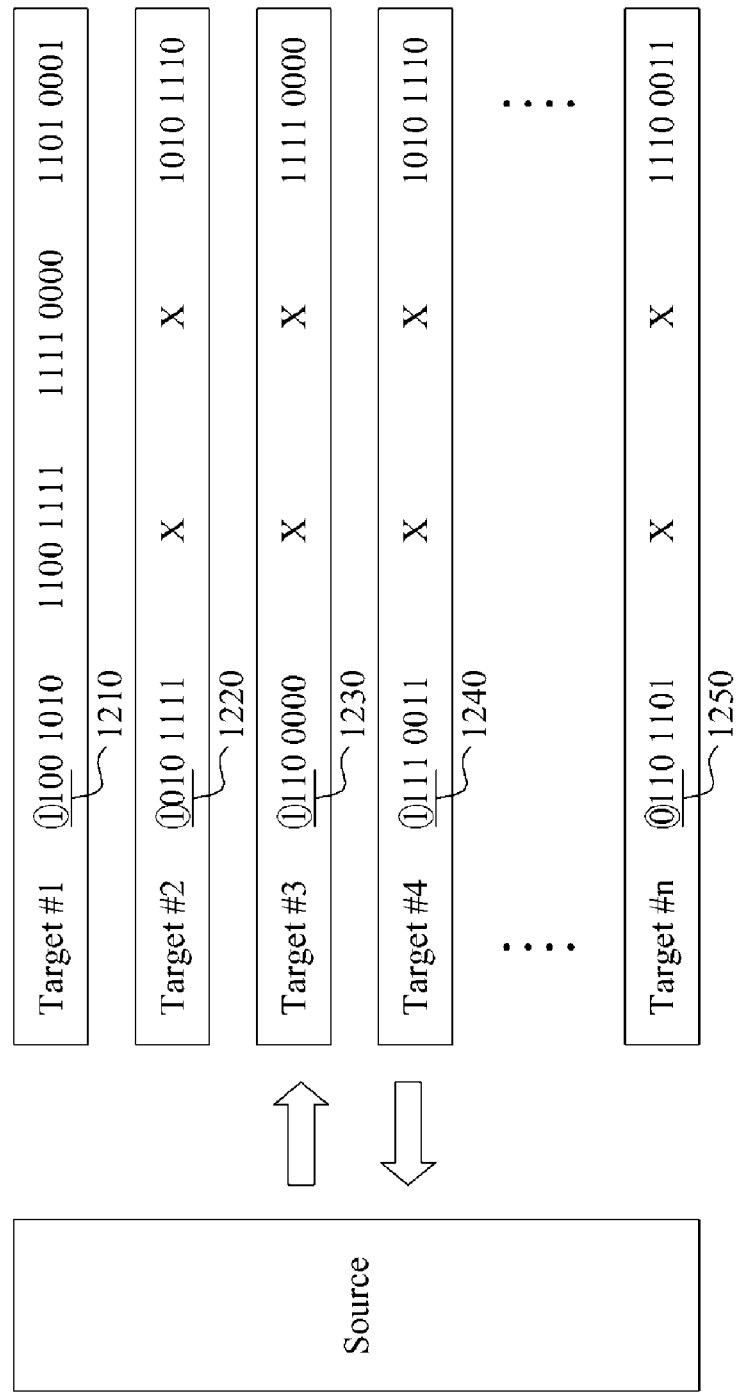
FIG. 12 is a diagram illustrating an example in which overlapping temporary IDs exist

FIG. 12 illustrates an example in which overlapping temporary IDs exist.

A target device may receive an access standard instruction from a source. The target device may create a temporary ID based on an access standard. For instance, the access standard may include a reference point, a call argument, and a movement argument.

Referring to FIG. 12, a reference point, a call argument, and a movement argument are set to an MSB, "3," and "0," respectively. The target devices may create respective temporary IDs, based on the reference point, the call argument, and the movement argument. A temporary ID of a first target device may be set to "110" 1210, and a temporary ID of a second target device may be set to "101" 1220. Additionally, a temporary ID of a third target device may be set to "111" 1230, and a temporary ID of a fourth target device may be set to "111" 1240. Furthermore, a temporary ID of an n-th target device may be set to "011" 1250. In some instances, the temporary ID of the third target device may be identical to the temporary ID of the fourth target device, that is, the temporary IDs may overlap.

The source may transmit a call parameter having a value in a range from "000" to "111." Additionally, the source may transmit a call parameter having a value in a range from "111" to "000." In FIG. 12, the source may transmit a call parameter having a value in the range from "000" to "111." When a temporary ID of a target device has the same value as a call parameter, the target device may transmit a response signal to the source. In some instances, when at least one response signal is received, the source may determine whether overlapping response signals exist among the at least one received response signal. And when the overlapping response signals are absent, the source may assign a control ID to the target device that transmits the response signal.

As illustrated in FIG. 12, the temporary ID of the n-th target device is less than the temporary IDs of the other targets and accordingly, the source may assign a control ID "1" to the n-th target device. The temporary ID of the second target device has a second smallest value and accordingly, the source may assign a control ID "2" to the second target device. Additionally, the temporary ID of the first target device has a third smallest value and accordingly, the source may assign a control ID "3" to the first target device.

Since the temporary ID of the third target device is the same as the temporary ID of the fourth target device, the source may not assign a control ID to the third target device and the fourth target device.

Figure 13:
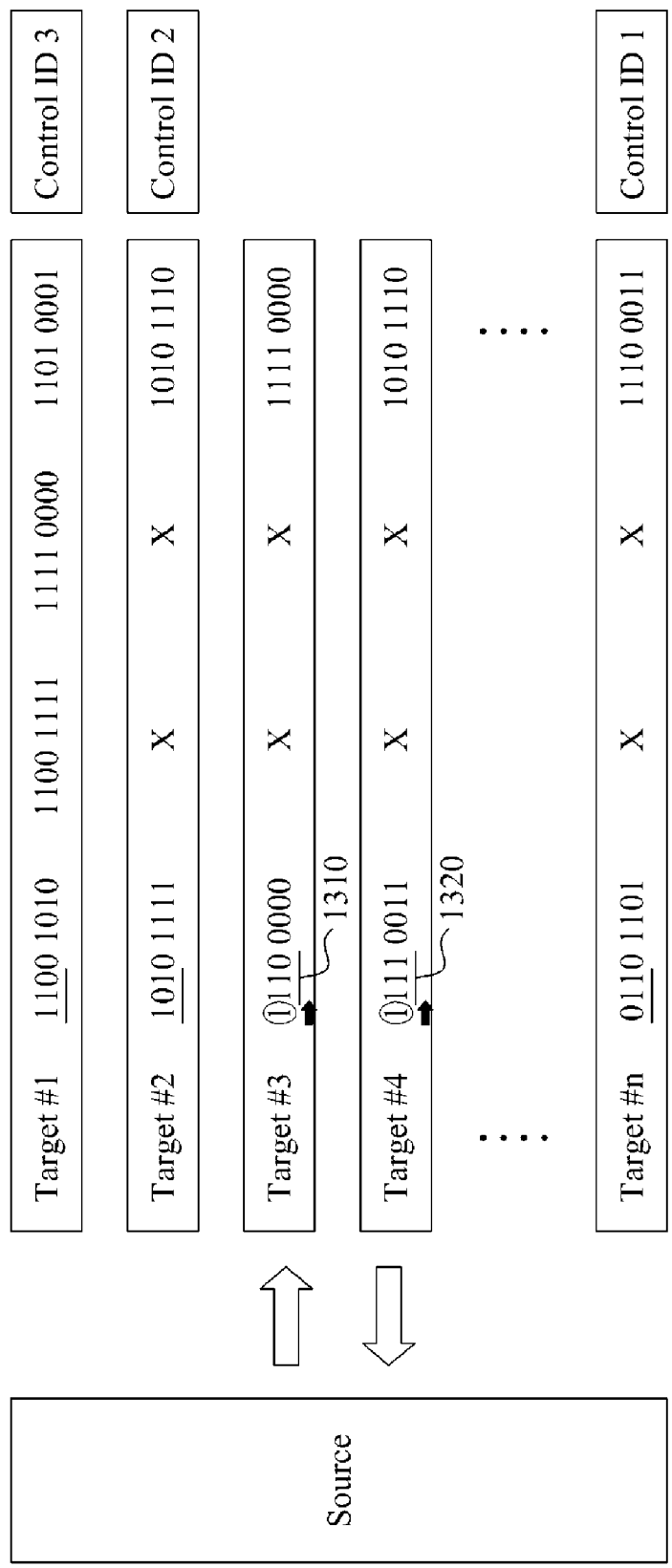
FIG. 13 is a diagram illustrating a process of using a call argument and a changed movement argument when overlapping temporary IDs exist as illustrated in FIG. 12, in an operation of identifying target devices to avoid collision.

FIG. 13 illustrates a process of using a call argument and a changed movement argument when overlapping temporary IDs exist as illustrated in FIG. 12, in an operation of identifying target devices to avoid collision.

The source may generate a call parameter based on a call argument, and may sequentially transmit the call parameters to target devices. For example, when the call argument is set to "3," a call parameter having a value in a range from "000" to "111" may be generated. And the source may transmit the call parameter having a value in the range from "000" to "111" to the target devices. The target devices may compare their temporary IDs to a received call parameter, and a target device having a temporary ID identical to the call parameter may transmit a response signal to the source.

The source may receive at least one response signal, and may determine whether overlapping temporary IDs exist, based on a number of the at least one received response signal. When the overlapping temporary IDs exist, the source may not assign a control ID. Conversely, when the number of the at least one received response signal is one and the overlapping temporary IDs are absent, the source may assign a control ID to a target device that transmit the response signal.

Referring to FIG. 13, a reference point, a call argument, and a movement argument are set to an MSB of, "3," and "1,"

respectively. Since control IDs are assigned in advance to the first target device, the second target device, and the n-th target device, respectively, the source may transmit, to the third target device and the fourth target device, an access standard instruction including the movement argument of "1." The third target device and the fourth target device may update their temporary IDs based on the reference point, the call argument, and the movement argument. Accordingly, the third target device may have a temporary ID of "110" 1310, and the fourth target device may have a temporary ID of "111" 1320.

The source may sequentially transmit a call parameter having a value in a range from "000" to "111" to the target devices. Since the temporary ID of the third target device is identical to a call parameter, the source may assign a control ID "4" to the third target device, prior to the fourth target device. Subsequently, the temporary ID of the fourth target device may be identical to another call parameter, and accordingly the source may assign a control ID "5" to the fourth target device. As described in the foregoing, the source may assign control IDs to the first target device through the n-th target device, respectively.

Additionally, a last control ID may be assigned based on information associated with a maximum number of targets that the source device is able to transmit power to, the information being stored in the system information area of the source illustrated in FIG. 15.

Figure 14:
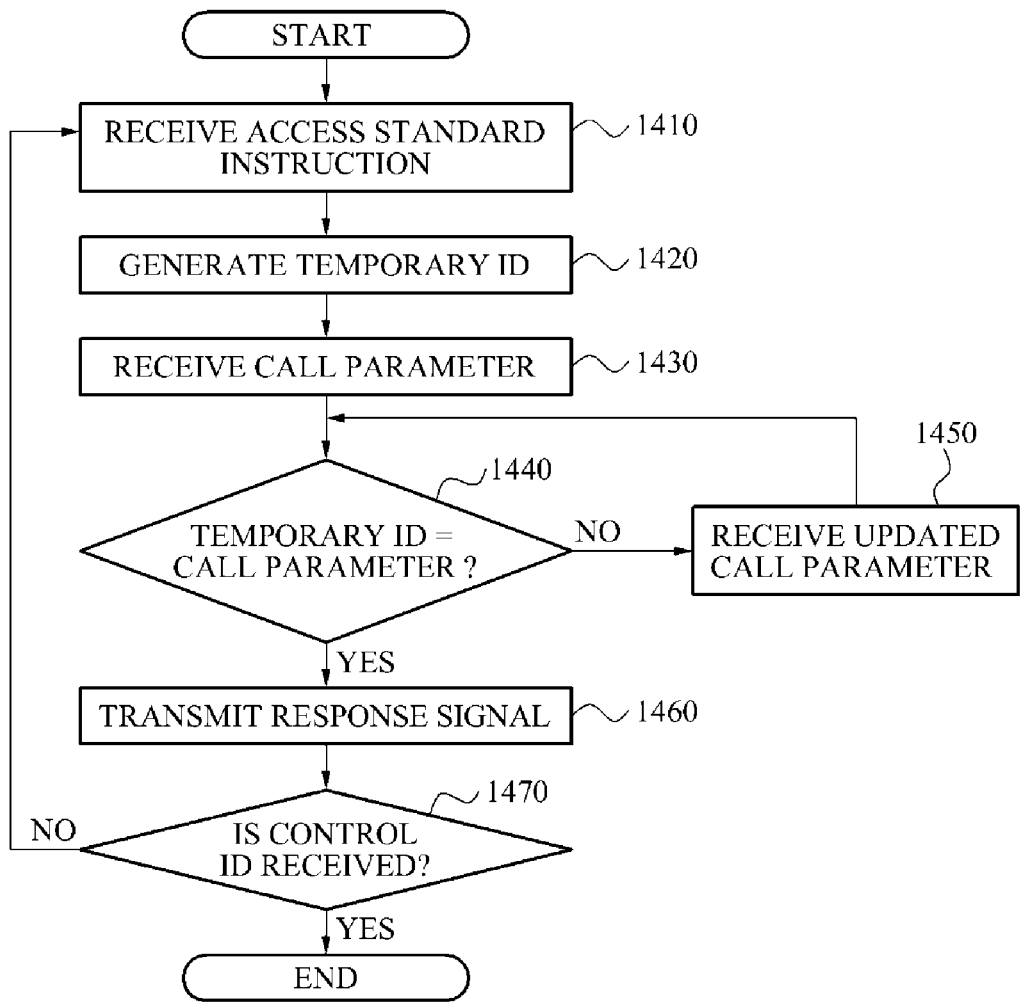
FIG. 14 is a flowchart illustrating an anti-collision method in wireless power transmission.

FIG. 14 illustrates an anti-collision method in wireless power transmission. The method of FIG. 14 has been described in terms of a target device.

The source device may be a device supplying wireless power, which includes an assortment of electronic devices that provide power, for example, pads, terminals, TV, and the like. In various instances, a target device may be a device receiving wireless power, and may include an assortment of electronic devices that consume power.

In operation 1410, the target device receives an access standard instruction from the source. The access standard instruction may include a reference point field, a call argument field, and a movement argument field.

In operation 1420, the target device creates a temporary ID based on an access standard. The target device may create the temporary ID based on a reference point, a call argument, and a movement argument.

In operation 1430, the target device receives a call parameter from the source. The call parameter may be determined based on a call argument included in the access standard instruction. For example, when the call argument is 3 bits, the call parameter may have a value in a range from "000" to "111." The target device may sequentially receive the call parameter having a value in the range from "000" to "111." Also, the target device may receive, from the source, an instruction corresponding to the call parameter. The instruction corresponding to the call parameter may include, for example, an instruction to call the temporary ID of the target device.

In operation 1440, the target device determines whether the temporary ID is identical to the received call parameter.

When the temporary ID is different from the received call parameter, the target device does not transmit a response signal in response to the call parameter in operation 1450. Subsequently, the target device may receive an updated call parameter from the source. As an example, when the target device has a temporary ID of "001," and when a call parameter having a value of "000" is received, the target device may not transmit a response signal in response to the call parameter. For example, the target device may receive an updated call parameter having a value of "001." And, when charging of the target device is not needed, or when the target device is incompatible with the source, the target device may not transmit a response signal in response to the call parameter.

When the temporary ID is identical to the received call parameter, the target device transmits a response signal in response to the call parameter in operation 1460.

In operation 1470, the target device determines whether a control ID is received from the source. The target device may receive the control ID from the source within a predetermined time, and may complete the method of FIG. 14. However, when the target device fails to receive the control ID within the predetermined time, the target device may determine that the temporary ID of the target device is the same as a temporary ID of another target device, or that the response signal is not transferred to the source, and may repeat operations 1410 to 1460.

FIG. 15 illustrates a structure of a system information area of a source.

To perform communication between a source and a target, the source and the target may need to have their own IDs. Accordingly, the source may call the target, or the target may call the source. Unique IDs may be assigned to the source and the target, respectively.

A unique ID of the source may be included in a system information area of the source, during manufacturing of a product. As illustrated in FIG. 15, the system information area may include, for example, a manufacturer ID zone, a product type zone, a model type zone, a serial number zone, a short ID zone, and a standard version ID zone.

The manufacturer ID zone may include information on a manufacturer of a product that is operated as a source. The product type zone may include information on a type of a product, information associated with a maximum output size for each product type, and information on a size of a resonator. The model type zone may include information associated with a maximum number of targets that may be charged by a product.

Additionally, the serial number zone may include a unique serial number assigned to a product during the manufacturing of the product. The unique serial number may include, for example, a production date of the product. The short ID zone may include a short ID created based on a unique serial number of a product. The short ID may be created by performing Exclusive OR (EOR), CRC, and the like with respect to the unique serial number. For example, when a serial number portion of the entire ID is extended due to a high production amount based on the production type, the short ID may reduce a time expended by the source to identify targets.

Furthermore, the standard version ID zone may include information on a standard of the source, for example, a maximum output of the source, a number of targets that may be charged by the source, an instruction that may be supported by the source, and the like.

The system information area of the source may additionally store information used to identify the source.

The unique ID of the source may refer to a unique serial number of a product, or a short ID.

FIG. 16 illustrates a structure of a system information area of a target.

A unique ID of a target may be included in a system information area of the target, during manufacturing of a product. As illustrated in FIG. 16, the system information area may include, for example, a manufacturer ID zone, a product type zone, a battery type zone, a serial number zone, a short ID zone, and a standard version ID zone.

The manufacturer ID zone may include information on a manufacturer of a product that is operated as a target. The product type zone may include information on a type of a product, for example, a television (TV), a camera, a mobile phone, and the like. Additionally, the product type zone may include information on a charging scheme of a product, and information on power consumption of a product. The battery type zone may include information on a type of a rechargeable battery contained in a product, and information on a current capacity and voltage capacity of the rechargeable battery.

Additionally, the serial number zone may include a unique serial number assigned to a product during manufacturing of the product. The unique serial number may include, for example, a production date of the product. The short ID zone may include a short ID created based on a unique serial number of a product. The short ID may be created by performing EOR, CRC, and the like with respect to the unique serial number. For example, when a device for receiving wireless power exists around the target, the short ID may be used to prevent an error from occurring due to mutual interference.

Furthermore, the standard version ID zone may include information on a standard of the target, for example, an instruction that may be supported by the target, information on power consumption, and the like.

The system information area of the target may additionally store information used to identify the target.

The unique ID of the target may refer to a unique serial number of a product, or a short ID.

The source and the target may identify each other by performing transmission and reception of their own IDs with each other. However, when a unique ID of the source and a unique ID of the target are extended, a large amount of time may be expended to identify the source and the target. Thus, a portion of unique IDs may be used to identify multiple targets.

FIG. 17 illustrates an electric vehicle charging system.

Referring to FIG. 17, an electric vehicle charging system 1700 includes a source system 1710, a source resonator 1720, a target resonator 1730, a target system 1740, and an electric vehicle battery 1750.

The electric vehicle charging system 1700 may have a similar structure to the wireless power transmission system of FIG. 1. The source system 1710 and the source resonator 1720 in the electric vehicle charging system 1700 may function as a source. Additionally, the target resonator 1730 and the target system 1740 in the electric vehicle charging system 1700 may function as a target.

The source system 1710 may include a variable SMPS, a power amplifier, a matching network, a controller, and a communication unit, similarly to the source 110 of FIG. 1. The target system 1740 may include a matching network, a rectification unit, a DC/DC converter, a communication unit, and a controller, similarly to the target 120 of FIG. 1.

The electric vehicle battery 1750 may be charged by the target system 1740.

The electric vehicle charging system 1700 may use a resonant frequency in a band of a few kilohertz (KHz) to tens of MHz.

The source system 1710 may generate power, based on a type of charging vehicle, a capacity of a battery, and a charging state of a battery, and may supply the generated power to the target system 1740.

The source system 1710 may control the source resonator 1720 and the target resonator 1730 to be aligned. For example, when the source resonator 1720 and the target resonator 1730 are not aligned, the controller of the source system 1710 may transmit a message to the target system 1740, and may control alignment between the source resonator 1720 and the target resonator 1730.

For example, when the target resonator 1730 is not located in a position enabling maximum magnetic resonance, the source resonator 1720 and the target resonator 1730 may not be aligned. When a vehicle does not stop accurately, the source system 1710 may induce a position of the vehicle to be adjusted, and may control the source resonator 1720 and the target resonator 1730 to be aligned.

The source system 1710 and the target system 1740 may transmit or receive an ID of a vehicle, or may exchange various messages, through communication.

The descriptions of FIGS. 3 through 16 may be applied to the electric vehicle charging system 1700. However, the electric vehicle charging system 1700 may use a resonant frequency in a band of a few KHz to tens of MHz, and may transmit power that is equal to or higher than tens of watts to charge the electric vehicle battery 1750.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An anti-collision method in wireless power transmission, the method comprising:
    transmitting, from a source device to a target device, an access standard instruction comprising an access standard that is used to identify the target device;
    transmitting, to the target device, a call parameter used to detect an identification (ID) of the target device, the call parameter being generated based on the access standard; and
    assigning, to the target device, a control ID based on a response signal that the target device transmits in response to receiving the call parameter.

2. The method of claim 1, wherein the access standard instruction comprises:
    a reference point field, a call argument field, a movement argument field, or any combination thereof,
    wherein the reference point field indicates a reference point used for generating an ID from a unique ID of the target device, the call argument field indicates predetermined n consecutive bits from the reference point, and the movement argument field indicates a number of bits corresponding to movement of the reference point.

3. The method of claim 2, wherein the unique ID of the target device is set as a unique serial number or a short ID stored in a system information area of the target device.

4. The method of claim 3, wherein the system information area of the target device comprises:
    a manufacturer ID zone, a product type zone, a battery type zone, a serial number zone, a short ID zone, a standard version ID zone, or any combination thereof.

5. The method of claim 2, wherein the transmitting of the call parameter comprises:
    transmitting, at predetermined time intervals, the call parameter generated based on a value set in the call argument field.

6. The method of claim 5, wherein the assigning comprises:
    assigning the control ID to the target device having an ID identical to the call parameter in response to the target device transmitting an acknowledgement (ACK) signal in response to receiving the call parameter.

7. The method of claim 5, wherein the transmitting of the access standard instruction comprises:
    changing a value set in the movement argument field, in response to an ACK signal being received from the target device having the same ID, so as to update the access standard instruction; and
    transmitting an updated access standard instruction to the target device having the same ID.

8. The method of claim 7, wherein the transmitting of the call parameter comprises:
    changing the set value in the call argument field, so as to update the call parameter; and
    transmitting, at predetermined time intervals, an updated call parameter to the target device having the same ID.

9. The method of claim 2, wherein the predetermined n bits set in the call argument field are determined based on a number of target devices.

10. The method of claim 2, wherein the predetermined n bits set in the call argument field are determined based on information associated with a maximum number of target devices that the source device is able to transmit power to, the information being stored in a system information area of the source device.

11. The method of claim 10, wherein the system information area of the source device comprises:
    a manufacturer ID zone, a product type zone, a model type zone, a serial number zone, a short ID zone, a standard version ID zone, or any combination thereof.

12. The method of claim 1, further comprising:
    sensing a plurality of target devices simultaneously accessing a wireless power transmission area of the source device.

13. The method of claim 1, further comprising:
    transmitting, to the target device, a wake-up power based on a system information area of the source device.

14. The method of claim 1, further comprising:
    transmitting wireless power, data, or both to the target device that receives the control ID.

15. An anti-collision method in wireless power transmission, the method comprising:
    transmitting, from a source device to one or more target devices in a wireless power transmission area, an access standard instruction including an access standard to be used for identifying the one or more target devices;
    transmitting, to the one or more target devices, a call parameter generated based on a value set in a call argument field;
    determining whether at least one response signal is received from the one or more target devices in response to the call parameter;
    determining whether overlapping identifications (IDs) exist among IDs of the one or more target devices based on a number of the at least one response signal, when the at least one response signal is received; and
    assigning a control ID to a target device that transmits a response signal, when the number of the at least one response signal is one and the overlapping IDs are absent among the IDs of the one or more target devices.

16. The method of claim 15, further comprising:
    determining whether the call parameter is a last call parameter when the at least one response signal is not received;
    changing the call parameter when the call parameter is not the last call parameter; and
    transmitting, to the one or more target devices, the call parameter that is changed.

17. The method of claim 15, further comprising:
    changing a value set in a movement argument field when the overlapping IDs exist among the IDs of the one or more target devices;
    transmitting, to one or more target devices having the same IDs, an updated access standard including the movement argument field in which the set value is changed; and
    transmitting an updated call parameter to the one or more target devices having the same ID.

18. The method of claim 17, further comprising:
    determining whether at least one response signal is received from the one or more target devices having the same ID in response to the updated call parameter;
    determining whether overlapping IDs exist among updated IDs of the one or more target devices based on a number of the at least one response signal, when the at least one response signal is received; and
    assigning a control ID to a target device that transmits a response signal when the number of the updated IDs of the target devices is one and the overlapping IDs are absent among the updated IDs of the one or more target devices.

19. An anti-collision method in wireless power transmission, the method comprising:
receiving an access standard instruction including an access standard to be used for identifying one or more target devices;
generating an ID of a target device, based on values set in a reference field, call argument field, and a movement argument field included in the access standard instruction;
receiving a call parameter generated based on the value set in the call argument field;
comparing the ID and the call parameter;
transmitting, to a source device, a response signal in response to the call parameter, when the ID has the same value as the call parameter; and
assigning, from the source device, a control ID.

20. The method of claim 19, further comprising:
receiving, from the source device, an updated access standard instruction, which is updated by changing a value set in the movement argument field, when the source device determines, based on at least one response signal, that one or more devices having the same ID exists; and
updating the ID of the target device, based on the updated access standard instruction.

21. The method of claim 20, further comprising:
receiving an updated call parameter, based on a number of the one or more target devices having the same ID;
comparing the updated ID and the updated call parameter;
transmitting, to the source device, a response signal in response to the updated access standard instruction when the updated ID has the same value as the updated call parameter; and
receiving a control ID from the source device.

22. An anti-collision apparatus in wireless power transmission, the apparatus comprising:
a communication unit configured to transmit, from a source device to a target device sensed during a predetermined time, a call parameter and an access standard instruction including an access standard to be used for identifying the target device, and to receive a response signal from the target device in response to receiving the call parameter; and
a controller configured to determine the call parameter based on the access standard instruction, and to assign a control identification (ID) to the target device, based on the response signal from the target device in response to the call parameter.

23. The apparatus of claim 22, further comprising:
a power converter configured to generate a wake-up power to be used by the one or more target devices, based on a system information area of the source device.

24. The apparatus of claim 22, wherein the controller controls transmission of wireless power, data, or both to the target device that receives the control ID.

25. An anti-collision apparatus in wireless power transmission, the apparatus comprising:
a target resonator configured to receive, from a source device, a wake-up power to be used for communication;
a communication unit configured to receive an access standard instruction including an access standard to be used for identifying one or more target devices, a call parameter generated based on the access standard instruction, and a control ID to be used for identifying the one or more devices, and to transmit a response signal to the source device in response to the call parameter when an ID of a target device has the same value as the call parameter; and
a controller configured to generate an ID of a target device, based on values set in a reference field included in the access standard instruction, a call argument field, and a movement argument field, and to determine whether the ID has the same value as the call parameter.

26. The apparatus of claim 25, wherein, when the control ID is received, the communication unit transmits an acknowledgement (ACK) signal in response to the reception.

27. The method of claim 1, wherein the ID of the target device is a temporary ID.

28. The apparatus of claim 22, wherein the control ID denotes an ID that the source device assigns to the target device to independently control the target device.

29. The apparatus of claim 22, wherein the call parameter is determined based on a call argument included in the access standard instruction.

* * * * *